United States Patent
Heng et al.

(10) Patent No.: US 6,989,174 B2
(45) Date of Patent: Jan. 24, 2006

(54) METHOD FOR ALUMINIDE COATING A HOLLOW ARTICLE

(75) Inventors: Yow Kwok Heng, Singapore (SG); Chen Keng Nam, Singapore (SG); Nigel Brian Thomas Langley, Danvers, MA (US); Janet Elizabeth Gaewsky, Reading, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/801,365

(22) Filed: Mar. 16, 2004

(65) Prior Publication Data

US 2005/0260346 A1     Nov. 24, 2005

(51) Int. Cl.
B05D 7/22 (2006.01)
C23C 16/00 (2006.01)

(52) U.S. Cl. ..................... 427/237; 427/252
(58) Field of Classification Search ............ 427/230, 427/237, 239, 250, 252, 253, 372.2, 375, 427/376.6, 376.7, 376.8, 383.1, 383.7; 416/231 R, 416/232, 241 R
See application file for complete search history.

(56) References Cited

U.S. PATENT DOCUMENTS

| | | | |
|---|---|---|---|
| 3,540,878 A | 11/1970 | Levine et al. | |
| 3,598,638 A | 8/1971 | Levine | |
| 3,958,047 A * | 5/1976 | Baldi | 427/252 |
| 5,334,417 A * | 8/1994 | Rafferty et al. | 427/253 |
| 5,366,765 A * | 11/1994 | Milaniak et al. | 427/229 |
| 5,897,966 A | 4/1999 | Grossklaus, Jr. et al. | |
| 6,010,746 A | 1/2000 | Descoteaux et al. | |
| 6,326,057 B1 | 12/2001 | Das et al. | |
| 6,730,179 B2 * | 5/2004 | Kircher | 148/240 |

* cited by examiner

*Primary Examiner*—Timothy Meeks
*Assistant Examiner*—William Phillip Fletcher, III
(74) *Attorney, Agent, or Firm*—McNees Wallace & Nurick LLC

(57) ABSTRACT

An aluminide coating is produced on a hollow article by furnishing an article having a hollow interior and an access opening to the hollow interior, placing an aluminide coating tape into the hollow interior through the access opening, and vapor phase aluminiding the hollow article using an external aluminum vapor source in addition to the aluminide coating tape.

16 Claims, 2 Drawing Sheets

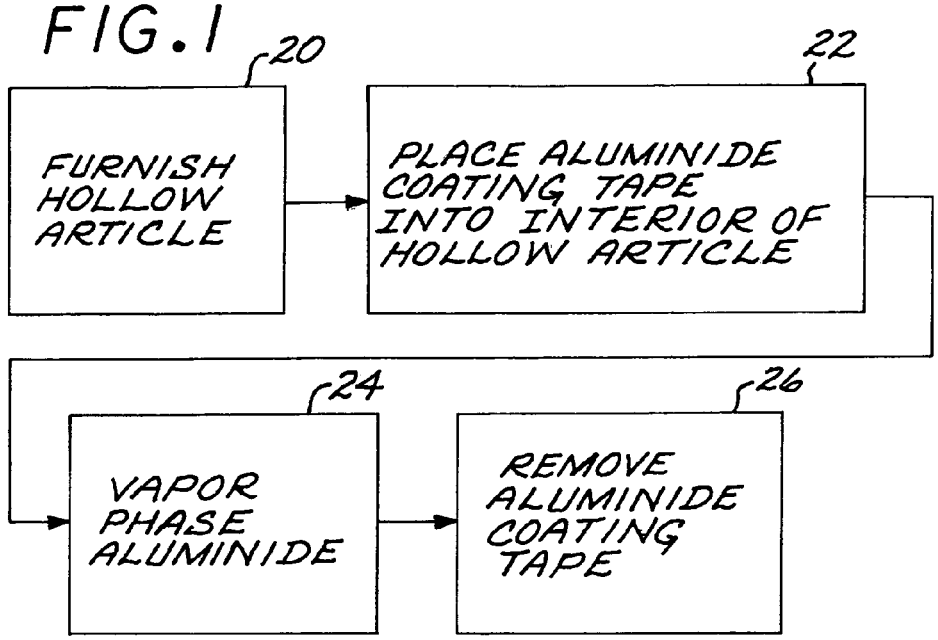
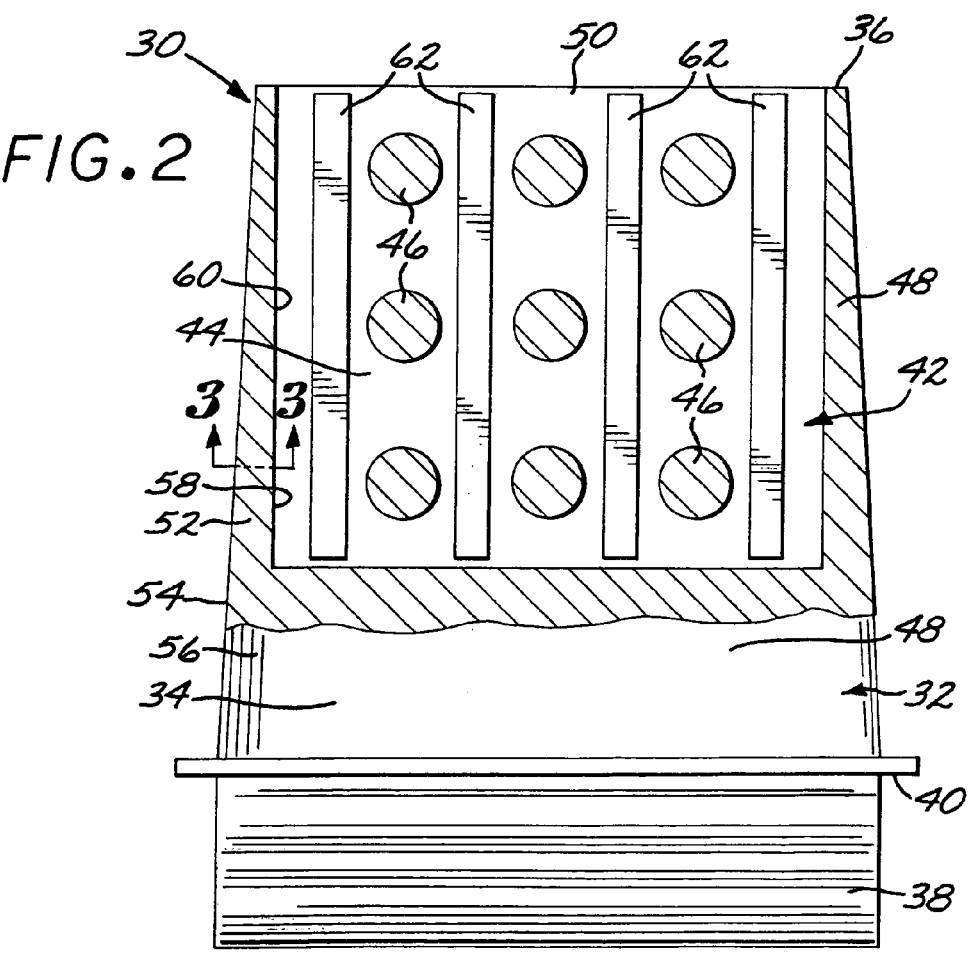

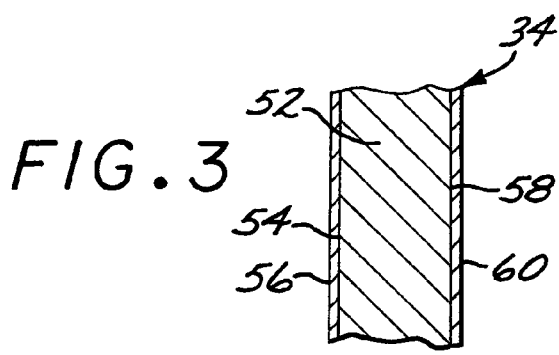
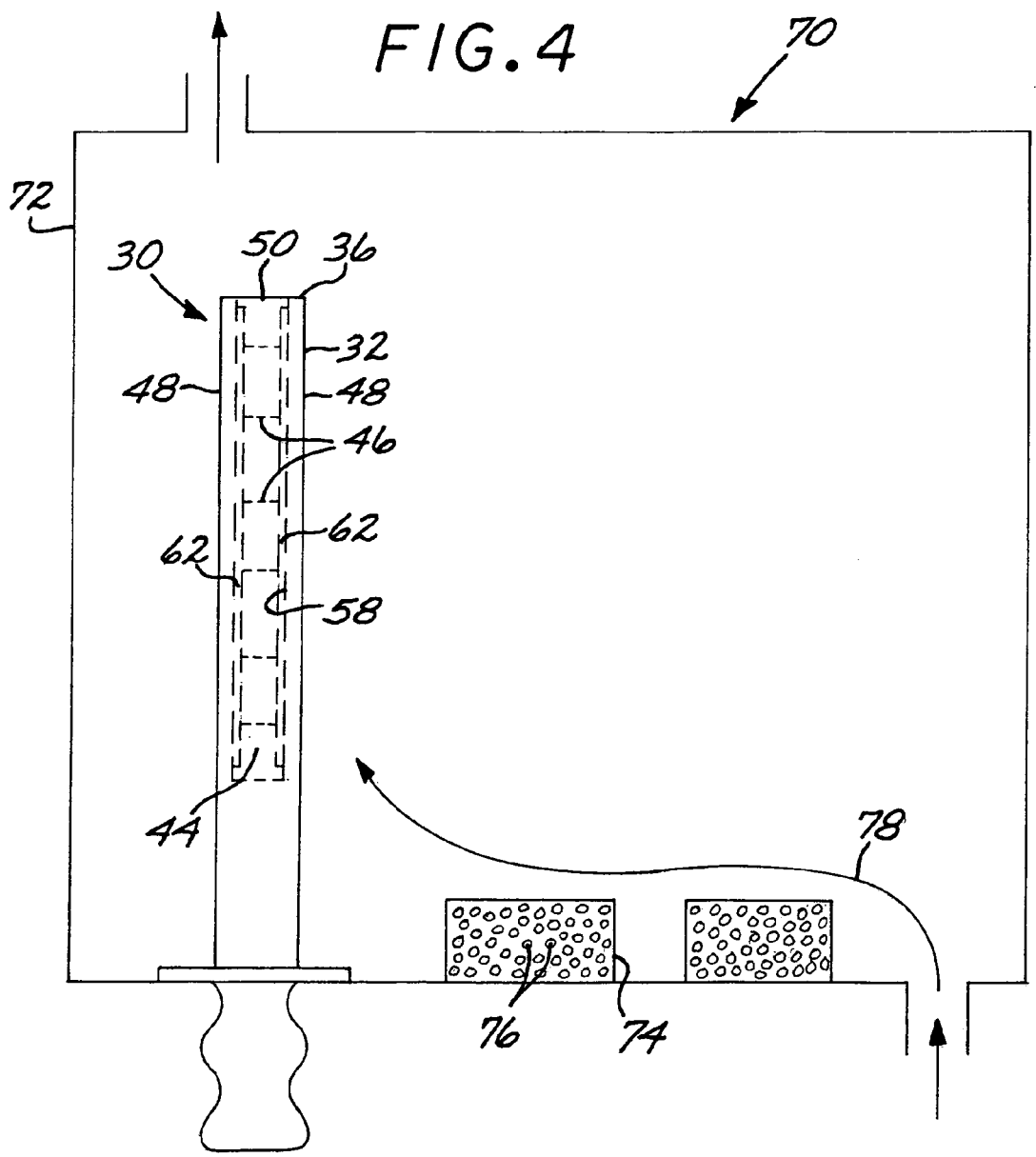

METHOD FOR ALUMINIDE COATING A HOLLOW ARTICLE

This invention relates to the application of aluminide coatings to articles and, more particularly, to the aluminide coating of hollow articles.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the respective turbine blades and vanes, which turns the shaft and provides power to the compressor. The hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the hot-section components of the engine. These components include the turbine vanes and turbine blades of the gas turbine, upon which the hot combustion gases directly impinge. In current engines, the turbine vanes and blades are made of nickel-based superalloys, and can operate at temperatures of up to about 1800–2100° F. At these temperatures, the components are subject to damage by oxidation and corrosion.

In one approach used to protect the hot-section components against oxidation and corrosion, a portion of the surface of the turbine blades is coated with a protective coating. One type of protective coating is an aluminum-containing protective coating deposited upon the substrate material to be protected. The deposited aluminum-containing coating interdiffuses into the substrate material, and the exposed surface of the aluminum-containing protective coating oxidizes to produce an adherent aluminum oxide scale that protects the underlying substrate.

Several techniques are available to coat the exterior surfaces of the turbine blades and vanes. However, in some cases the airfoil sections are hollow, to permit a through-flow of cooling air or to reduce the weight of the airfoil section, or for both reasons. The uniform coating of the exterior and interior surfaces of the hollow sections is difficult to achieve, particularly where there is no possibility for an end-to-end flow through of a coating vapor and particularly in refurbishment operations after the turbine blades or vanes have been used in service and are returned for refurbishment.

There is a need for an approach to coating the exterior surfaces and also the interior surfaces of such components, with an aluminide coating that is reasonably uniform in thickness. The present invention fulfills this need, and further provides related advantages.

BRIEF SUMMARY OF THE INVENTION

The present invention provides a method for producing an aluminide coating on the interior and the exterior surfaces of a hollow article. The technique is particularly useful in the refurbishment of hollow articles that have previously been in service. This approach achieves a robust, sufficiently thick, reasonably uniform coating over the interior surfaces and the exterior surfaces.

A method for producing an aluminide coating on a hollow article comprises the steps of furnishing an article having a hollow interior and an access opening to the hollow interior, placing an aluminide coating tape into the hollow interior through the access opening, and vapor phase aluminiding ("VPA") the hollow article using an external aluminum vapor source separate from the aluminide coating tape. Typically, the article has previously been in service, and the present method is used to refurbish the article.

In applications of most interest, the article is a nickel-base alloy, and most preferably is a nickel-base superalloy. In this application, the article is a turbine blade with an airfoil section having at least a portion of the airfoil hollow. The hollow interior extends from a blade tip into a portion of the airfoil section. In one embodiment, the hollow interior does not extend the entire length of the turbine blade, so that there is no possibility of a flow-through of a coating vapor from one end of the hollow interior to the other along the length of the turbine blade. The article may also be a cobalt-base alloy.

Most preferably, the aluminide coating tape comprises at least about 85 percent by weight of an aluminum-containing alloy powder, with the remainder an organic binder and, optionally, an activating agent such as ammonium chloride. The organic binder burns off during the subsequent heating associated with the vapor phase aluminiding, without leaving an organic residue. The size and number of the aluminide coating tapes that are placed into the hollow interior of the airfoil section depend upon the size of the hollow interior. Where the hollow interior cavity is of a size 0.93 inches deep, 0.8 inches long (leading edge of cavity to trailing edge of cavity), and 0.16 inches maximum width, it is preferred that a total of four pieces of tape, each 0.015 inch thick, 0.1 inch wide, and 0.95 inch long, be placed into the cavity, positioned between existing stiffeners that extend between the walls of the cavity.

The vapor phase aluminiding is performed using an external aluminum vapor source separate from the aluminide coating tape. To perform the vapor phase aluminiding, the hollow article having the aluminide coating tape in the hollow interior is heated to an aluminiding temperature of at least about 1875° F., preferably about 1975° .F+/−25° F., in an atmosphere comprising aluminum vapor. In a typical aluminiding process, the hollow article having the aluminide coating tape in the hollow interior is placed into an interior of a heated aluminiding container, an aluminum-containing alloy is placed in communication with the interior of the aluminiding container, and the hollow article having the aluminide coating tape in the hollow interior and the aluminum-containing alloy are heated to the aluminiding temperature for a period of time sufficient to deposit the desired thickness of the aluminide coating onto the interior surface and the exterior surface.

Prior to developing the present approach, attempts were made to refurbish the aluminide coating using only the vapor phase aluminiding process. The result was that the aluminum vapor did not penetrate into the interior of the hollow cavity to deposit a sufficiently thick and uniform coating. The coating tape inserted into the hollow interior, in addition to the vapor phase aluminiding using a separate, external source, results in a sufficiently thick and uniform aluminide coating over the exterior surface of the airfoil and the interior surface of the hollow portion of the airfoil. The coating tape provides a dependable, convenient source of aluminide vapor in the interior of the hollow article. A powder source is not used within the interior of the hollow article because it is more difficult to control the powder chemistry and to handle the powder, there is a less uniform coating distribution produced with the powder source, the powder source uses a different optimum coating temperature, and the powder-source approach is less environmentally friendly, as compared with the use of the aluminide coating tape.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block flow diagram of a preferred approach for practicing an embodiment of the invention;

FIG. 2 is a schematic view of a hollow gas turbine blade with a portion of the wall of the airfoil broken away to show the aluminide coating tapes inserted into its hollow interior;

FIG. 3 is an enlarged sectional view through a wall of the gas turbine blade of FIG. 2, taken on line 3—3; and FIG. 4 is a schematic view of the hollow turbine blade in a VPA coating aluminiding container.

DETAILED DESCRIPTION OF THE INVENTION

FIG. 1 depicts a preferred approach for producing an aluminide coating on a hollow article. The hollow article is furnished, step 20. FIG. 2 illustrates a preferred form of an article 30 that may be processed using the present approach. In this case, the article 30 is a gas turbine blade 32. The gas turbine blade 32 includes an airfoil section 34 having a blade tip 36, an attachment 38 in the form of a dovetail or fir-tree section, and a platform 40 extending laterally outwardly from a location between the airfoil section 34 and the attachment 38.

The gas turbine blade 32 is preferably made of a single piece of a metallic alloy, more preferably a nickel-base alloy, and most preferably a nickel-base superalloy. As used herein, "nickel-base" means that the composition has more nickel present than any other element. The nickel-base superalloys are typically of a composition that is strengthened by the precipitation of gamma-prime phase or a related phase. A typical nickel-base alloy has a composition with numerical amounts of the constituent elements, in weight percent, in subranges of broad ranges of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities, although nickel-base superalloys may have compositions outside this range. The gas turbine blade 32 may instead be made out of a cobalt-base alloy, which has more cobalt present than any other element. Such cobalt alloys are known in the art for use in turbine blades. An example of such a cobalt-base alloy is alloy Mar M509, having a nominal composition in weight percent of about 0.6 percent carbon, about 0.1 percent manganese, about 0.4 percent silicon, about 22.5 percent chromium, about 1.5 percent iron, about 0.2 percent titanium, about 0.01 percent boron, about 0.5 percent zirconium, about 10 percent nickel, about 7 percent tungsten, about 3.5 percent tantalum, balance cobalt and minor elements The gas turbine blade 32 has a hollow interior 42 in the form of a cavity 44 extending from the blade tip 36 into a portion of the airfoil section 34. The illustrated turbine blade 32 is an uncooled turbine blade, and the hollow interior 42 is present to reduce the weight of the turbine blade. The cavity 44 is a blind cavity and does not extend the entire length of the gas turbine blade 32 in this preferred application. Consequently, it is not possible to flow an aluminum-bearing gas through the cavity 44 from end to end. A series of rodlike stiffeners 46 extend through the hollow interior 42 between the opposing sides 48 of the cavity 44 to strengthen and stiffen the turbine blade 32. These stiffeners 46 are present in the gas turbine blade 32 for structural reasons, and their presence is not necessitated by the present approach. In the illustrated turbine blade 32, an access opening 50 to the blind-cavity hollow interior 42 is through the blade tip 36. The present approach may also be used where the cavity 44 is a through cavity so that an aluminum-containing gas may flow straight through the cavity 44 from end to end, but the greatest advantages of the present approach are realized where the cavity 44 is a blind cavity. Thus, the present approach is also operable with cooled turbine blades wherein a cooling flow of air is passed through the hollow interior of the turbine blade.

FIG. 3 is a sectional view through a wall 52 of the airfoil section 34. It is desired that an exterior surface 54 of the wall 52 having an exterior aluminide coating 56 thereon, and that an interior surface 58 of the wall 52 have an interior aluminide coating 60 thereon. If conventional vapor phase aluminiding is performed for the airfoil section 34 of the gas turbine blade 32 during refurbishment procedures after the gas turbine blade 32 has been in service, the exterior aluminide coating 56 is readily applied. However, the interior aluminide coating 60 is uneven in thickness and generally not sufficiently thick near the bottom of the cavity 44.

To accomplish the coating of the interior surface 58, an aluminide coating tape 62, sometimes termed a codep tape, is placed into the hollow interior 42 of the airfoil section 34 of the gas turbine blade 32 through the access opening 50. In the configuration of the gas turbine blade 32 of FIG. 2, a plurality of aluminide coating tapes 62 are placed between the stiffeners 46. The aluminide coating tape 62 may optionally contain an activator. Most preferably, the aluminide coating tape comprises at least about 85 percent by weight of an aluminum-containing alloy powder, with the remainder an organic binder and, optionally, an activating agent such as ammonium chloride. The organic binder burns off during the subsequent heat treatment without leaving an organic residue. Such aluminide coating tape 62 is known in the art, see for example U.S. Pat. No. 5,334,417, whose disclosure is incorporated by reference, and is available commercially, for example from Vitta Corporation of Bethel, Conn. or Sulzer Metco Corporation of Switzerland. Such aluminide coating tape 62 has been previously used for aluminide coating operations. However, such aluminide coating tape has not been used to coat interior surfaces, as far as the inventors are aware. The size and number of the aluminide coating tapes 62 that are placed into the hollow interior 42 of the airfoil section 34 depends upon the size of the hollow interior 42. Where the hollow interior 42 is a blind cavity of a size 0.93 inches deep, 0.8 inches long (leading edge of cavity to trailing edge of cavity), and 0.16 inches maximum width, it is preferred that a total of four pieces of tape, each 0.015 inch thick, 0.1 inch wide, and 0.95 inch long, be placed into the cavity 44, positioned between stiffeners 46 that extend between the walls of the cavity 44.

After the aluminide coating tape 62 is placed into the hollow interior 42 of the airfoil section 34, step 22 of FIG. 1, the hollow article 30 is vapor phase aluminided, step 24, using an external aluminum vapor source separate from the aluminide coating tape 62. FIG. 4 depicts an operable vapor phase aluminiding apparatus 70. The article 30 to be coated with an aluminide coating, here the airfoil section 34 of the gas turbine blade 32, is placed into an aluminiding container 72. Typically, many gas turbine blades 32 are loaded into the aluminiding container 72 for aluminiding in a single coating operation, but only one is shown in FIG. 4. In the illustrated approach, the underside of the platform 40 and the attachment 38 are not to be coated with aluminum. Therefore, the attachment 38 is positioned outside the aluminiding container 72, while the underside of the platform 40 is sealingly positioned along the wall of the aluminiding container 72 or otherwise positioned such that the underside of the platform 40 does not receive an aluminum coat.

An aluminiding-gas source is provided in communication with the interior of the aluminiding container 72. In the illustrated approach, an external source of aluminum vapor is baskets 74 of chromium-aluminum alloy pellets 76 positioned near the gas turbine blade 32 to be vapor phase aluminided, in the aluminiding container 72. (This aluminum vapor source is described as being external to the gas turbine blade 32 to distinguish it from the aluminide coating tape 62, which is internal to the gas turbine blade 32.) The aluminiding container 72 containing the baskets 74 and the gas turbine blade(s) 32 are heated in an argon or hydrogen atmosphere at a heating rate of about 50° F. per minute to a temperature of greater than about 1875° F., preferably about 1975° F. +/−25° F. At this temperature, aluminum vaporizes from the pellets 76. The aluminum vapor diffuses to the surfaces of the gas turbine blade 32, and deposits to form an aluminide coating thereon. Most of the aluminum deposits on the exterior surfaces 54, and little diffuses into the hollow cavity 44 to deposit on the interior surfaces 58. The gas turbine blade 32 is held at that temperature for a time sufficient to deposit the desired thickness of the aluminide coating, typically about 4 hours +/−15 minutes, during which time aluminum is deposited, and then slow cooled to about 250° F. and thence to room temperature. Optionally, a flow 78 of a carrier gas such as argon or hydrogen may be introduced into the aluminiding container 72 so that it passes over and through the baskets 74 to entrain and carry the aluminum vapor produced by the vaporization of the pellets 76 to the gas turbine blade 32. These coating times and temperatures may be varied to alter the thickness of the deposited aluminum-containing layer.

During this heating cycle, aluminum vapor is also produced by the aluminide coating tapes 62 proximate to the interior surfaces 58. The aluminum vapor produced by the aluminide coating tapes 62 diffuses to the interior surfaces 58 and deposits as the primary source of the aluminum that forms the interior aluminide coating 60. Some of the aluminum vapor produced from the pellets 76 may also find its way into the hollow interior 42, but experience has shown that this aluminum vapor deposits primarily on the exterior surfaces 54 and does not diffuse to the interior surfaces 58. If only the aluminum vapor produced from the pellets 76 is used, the interior coating deposited on the interior surfaces 58 is insufficiently thick to protect those interior surfaces 58. When the present approach of producing aluminum vapor from the aluminiding coating tape source within the hollow interior is used in conjunction with the external source, here the pellets 76 in the exterior baskets 74, the aluminide coating thickness is sufficiently thick and even on both the interior surfaces 58 and the exterior surface 56.

Another approach would be to use aluminide source powders in the hollow interior 42 as the source of aluminum vapor. This approach, used in new-make manufacturing, is not acceptable for refurbishment because it is less environmentally friendly, because its optimum coating temperature is different from that of the vapor phase aluminiding process that provides the exterior aluminide coating 60, and because the aluminum source powder is more difficult to handle and control than is the aluminide coating tape 62.

After the desired thicknesses of aluminum is deposited upon the exterior surface 54 and upon the interior surface 58, and the gas turbine blade 32 is cooled to room temperature, the now-partially-depleted aluminide coating tape 62 is removed from the hollow interior 42, step 26.

The present approach has been practiced by coating hollow gas turbine blades having a structure similar to that depicted in FIG. 2, by the approach depicted in relation to FIG. 1 and using the VPA apparatus 70 similar to that depicted in FIG. 4. The cavity dimensions and coating tape are as described above. The objective was to produce an aluminide coating having a minimum thickness of 0.0015 inch for both the exterior aluminide coating 56 and the interior aluminide coating 60. For comparison, gas turbine blades were given the same vapor phase aluminiding treatment, in a first comparative case without any aluminum-vapor source within the hollow interior 42, and in a second comparative case using aluminum-source powders filled into the cavity 44. In all cases, the thickness of the exterior aluminide coating 56 was more than 0.0015 inch. However, the thickness of the interior aluminide coating 60 varied according to the processing used. Where no aluminiding source was placed into the cavity 44, the thickness of the interior aluminide coating 60 near the bottom of the cavity 44 varied from 0 to less than 0.0005 inch. Where a powder aluminiding source was placed into the cavity 44, the thickness of the interior aluminide coating 60 near the bottom leading and trailing edges of the cavity 44 was about 0.0008 inch minimum. Where the aluminide coating tape 62 was placed into the cavity 44 in the manner described earlier, the thickness of the interior aluminide coating 60 was a robust 0.0015 inch minimum throughout the cavity, thereby closely matching the thickness of the exterior aluminide coating 56.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing an aluminide coating on a hollow article, comprising the steps of
   furnishing an article having a hollow interior and an access opening to the hollow interior;
   placing an aluminide coating tape into the hollow interior through the access opening; and
   vapor phase aluminiding the hollow article using an external aluminum vapor source separate from the aluminide coating tape.

2. The method of claim 1, wherein the step of furnishing includes the step of
   furnishing the article that has previously been in service.

3. The method of claim 1, wherein the step of furnishing includes the step of
furnishing the article comprising a nickel-base alloy.

4. The method of claim 1, wherein the step of furnishing includes the step of
furnishing the article comprising a nickel-base superalloy.

5. The method of claim 1, wherein the step of furnishing includes the step of
furnishing the article comprising a cobalt-base alloy.

6. The method of claim 1, wherein the step of furnishing includes the step of
furnishing the article having an airfoil section having at least a portion of the airfoil hollow.

7. The method of claim 1, wherein the step of furnishing includes the step of
furnishing the article as a gas turbine blade having the hollow interior extending from a blade tip into a portion of the airfoil section.

8. The method of claim 1, wherein the step of placing includes the step of
providing the aluminide coating tape comprising an aluminum-containing alloy powder and a binder.

9. The method of claim 1, wherein the step of vapor phase aluminiding includes the step of
heating the hollow article having the aluminide coating tape in the hollow interior to a temperature of at least about 1875° F. in an atmosphere comprising aluminum vapor.

10. The method of claim 1, wherein the step of vapor phase aluminiding includes the step of
heating the hollow article having the aluminide coating tape in the hollow interior to a temperature of about 1975° F.+/−25° F., in an atmosphere comprising aluminum vapor.

11. The method of claim 1, wherein the step of vapor phase aluminiding includes the step of
placing the hollow article having the aluminide coating tape in the hollow interior into an interior of an aluminiding container,
placing an aluminum-containing alloy in communication with the interior of the aluminiding container, and
heating the hollow article having the aluminide coating tape in the hollow interior and the aluminum-containing alloy to a temperature of at least about 1875° F.

12. The method of claim 11, wherein the step of placing includes the step of
providing the aluminide coating tape comprising an aluminum-containing alloy powder and a binder.

13. The method of claim 1, wherein the step of furnishing includes the step of
furnishing the article as an uncooled gas turbine blade having the hollow interior as a blind cavity extending from a blade tip into a portion of the airfoil section but not through the entire turbine blade.

14. The method of claim 1, wherein the step of furnishing includes the step of
furnishing the article as a cooled gas turbine blade having the hollow interior extending through the entire length of the turbine blade.

15. A method for producing an aluminide coating on a hollow article, comprising the steps of
furnishing an airfoil made of a nickel-base superalloy or a cobalt-base alloy and having at least a portion of the airfoil hollow as a blind hollow cavity extending from a blade tip into the airfoil but not through the entire airfoil, wherein the airfoil has previously been in service;
placing an aluminide coating tape into the hollow interior through the access opening; and
vapor phase aluminiding the hollow article using an external aluminum vapor source separate from the aluminide coating tape, wherein the step of vapor phase aluminiding includes heating the airfoil to a temperature of at least about 1875° in an atomosphere comprising aluminum vapor.

16. A method for producing an aluminide coating on a hollow article, comprising the steps of
furnishing an airfoil made of a nickel-base superalloy and having at least a portion of the airfoil a blind hollow cavity extending from a blade tip into the airfoil but not through an entire length of the airfoil, wherein the hollow cavity has an access opening sufficiently large to receive an aluminide coating tape therethrough, and wherein the airfoil has previously been in service;
placing the aluminide coating tape into the hollow interior through the access opening, wherein the aluminide coating tape comprises an aluminum-containing alloy powder and a binder; and
vapor phase aluminiding the hollow article using an external aluminum vapor source separate from the aluminide coating tape.

\* \* \* \* \*